(12) United States Patent
Yoon et al.

(10) Patent No.: US 7,850,356 B2
(45) Date of Patent: Dec. 14, 2010

(54) REFLECTION SHEET AND BACKLIGHT UNIT EMPLOYING THE SAME

(75) Inventors: Jong-Sun Yoon, Cheonan (KR); Min-Seok Seo, Incheon (KR); Jin-Uk Heo, Cheonan (KR)

(73) Assignee: SKC Haas Display Films Co., Ltd., Chungcheongnam-do (KR)

( * ) Notice: Subject to any disclaimer, the term of this patent is extended or adjusted under 35 U.S.C. 154(b) by 614 days.

(21) Appl. No.: 11/662,671

(22) PCT Filed: Sep. 12, 2005

(86) PCT No.: PCT/KR2005/003007

§ 371 (c)(1),
(2), (4) Date: Dec. 17, 2007

(87) PCT Pub. No.: WO2006/031043

PCT Pub. Date: Mar. 23, 2006

(65) Prior Publication Data

US 2008/0247175 A1     Oct. 9, 2008

(30) Foreign Application Priority Data

Sep. 13, 2004  (KR) .......... 10-2004-0072954
Sep. 10, 2005  (KR) .......... 10-2005-0084416

(51) Int. Cl.
*F21V 7/22* (2006.01)
*B32B 3/00* (2006.01)

(52) U.S. Cl. .......... 362/609; 362/341; 362/97.2; 428/156

(58) Field of Classification Search .......... 362/609, 362/341, 97.1, 97.2; 428/156
See application file for complete search history.

(56) References Cited

U.S. PATENT DOCUMENTS

| | | | |
|---|---|---|---|
| 6,846,579 B2 * | 1/2005 | Anderson et al. | 428/690 |
| 7,661,832 B2 * | 2/2010 | Iwata et al. | 359/601 |
| 2009/0067157 A1 * | 3/2009 | Cooper et al. | 362/97.2 |

FOREIGN PATENT DOCUMENTS

| | | |
|---|---|---|
| JP | 2001-201612 | 7/2001 |
| JP | 2003-092018 A | 3/2003 |
| JP | 2003-100127 A | 4/2003 |
| JP | 2004-085633 A | 3/2004 |
| KR | 10-2003-0025192 A | 3/2003 |
| KR | 10-2004-0039222 A | 5/2004 |

* cited by examiner

*Primary Examiner*—Anabel M Ton
(74) *Attorney, Agent, or Firm*—Frommer Lawrence & Haug LLP; Ronald R. Santucci

(57) ABSTRACT

Provided are a reflection sheet for a backlight unit including: a base sheet; and a flexible coating layer, formed on at least a surface of the base sheet, containing at least one flexible elastomeric bead selected from the group consisting of an elastomeric acrylic bead, an elastomeric nylon bead, and a microcapsule resin bead having a core charged with an air or an organic material, and a backlight unit for a liquid crystal display employing the reflection sheet. The reflection sheet may further include a metal reflection layer. The reflection sheet including the flexible coating layer exhibits excellent resistance to friction and impact. The reflection sheet including both the flexible coating layer and the metal reflection layer is excellent in specular reflectivity and brightness as well as in resistance to friction and impact. Therefore, the reflection sheet can be usefully applied to a light guide panel of a backlight unit having a weak surface hardness or requiring a surface protection due to a surface prism pattern.

21 Claims, 3 Drawing Sheets

REFLECTION SHEET AND BACKLIGHT UNIT EMPLOYING THE SAME

This application is a 371 of PCT/KR2005/003007 filed on Sep. 12, 2005, published on Mar. 23, 2006 under publication number WO 2006/031043 A1 which claims priority benefits from Korean Patent Application No. 10-2004-0072954 filed Sep. 13, 2004 and Korean Patent Application No. 10-2005-0084416 filed Sep. 10, 2005.

Technical Field

The present invention relates to a reflection sheet for protecting a light guide panel and a backlight unit employing the same.

Background Art

A rear surface of a liquid crystal layer of a liquid crystal display (LCD) is provided with a backlight unit illuminating the liquid crystal layer. Among these types of backlight units, an edgelight-type backlight unit 100, as illustrated in FIG. 1, includes a rod-shaped cold cathode fluorescent lamp (CCFL) 101 which is used as a light source and extends along a side of a rectangular-shaped light guide panel 104, an optical sheet 106 including a plurality of layers stacked on a front surface of the light guide panel 104, and a reflection sheet 102 disposed on a rear surface of the light guide panel 104. Each layer of the optical sheet 106 has a specific optical property such as refraction, diffusivity, and so forth. In detail, the optical sheet 106 includes a light diffusion sheet 108 disposed on a front surface of the light guide panel 104, a prism sheet 110 disposed on a front surface of the light diffusion sheet 108, and so forth.

The backlight unit 100 provides the following functions. First, light beams incident into the light guide panel 104 from the fluorescent lamp 101 are first reflected on reflection dots (not shown in the Figure) of the rear surface of the light guide panel 104 and on each of the side faces, and exit from the front surface of the light guide panel 104. That is, the light guide panel 104 serves as a surface light source. The light beams exited from the light guide panel 104 enter into the light diffusion sheet 108, then diffuse and exit from the front surface of the light diffusion sheet 108. Thereafter, the light beams exited from the light diffusion sheet 108 enter into a prism sheet 110, and exit as light beams having a distribution representing a peak in a direction along a substantially normal line through a prism part 110-1 formed on the front surface of the prism sheet 110. Accordingly, the light beams exited from the fluorescent lamp 101 is diffused by the light diffusion sheet 108, while being refracted by the prism sheet 110 so that it represents a peak in a direction along the substantially normal line, and illuminate the entire face of the upper liquid crystal layer although not shown in the Figure.

As described above, the reflection sheet 102 is disposed on the rear surface of the light guide panel 104. Conventionally, the reflection sheet 102 is usually composed of a white opaque polyester film or a laminated film where a surface or both surfaces of a white opaque polyester film are coated with a hard coating layer containing a large quantity of an organic or inorganic filler for the purpose of increasing reflectivity. Such a reflection sheet 102 is responsible for efficiently reflecting light beams directed toward the underlying structure to the front surface of the light guide panel 104 and to the overlying light diffusion sheet 108, to thereby increase brightness of an LCD and for preventing the underlying structure disposed below the backlight unit 100 from being viewed from the front side of an LCD.

Thus, the reflection sheet 102 must have a uniform surface with respect to the entire surface of the light guide panel 104 so that light beams are uniformly reflected in all directions.

DISCLOSURE OF INVENTION

Technical Problem

Meanwhile, an acrylic resin-based light guide panel commonly used as the light guide panel 104 has a relatively high surface hardness, and thus hardly experiences a surface damage by an interfacial friction generated upon a contact between a light guide panel and a reflection sheet during backlight unit assembling or by an external impact. In addition, most commonly known light guide panels have a smooth and flat surface and the underlying printed layer of a light guide panel also has a smooth and flat surface, and thus the surface characteristics of a reflection sheet are not likely to be an issue.

However, a light guide panel having a prism pattern on its upper or lower surface was recently developed to further increase the brightness of an LCD and has been gradually commercially available. The prism-patterned light guide panel is a light guide panel in which a three-dimensional triangular prism pattern is formed on a panel surface by injection molding or laser processing. The prism pattern has a sharp upper end. Thus, in the case of using a conventional reflection sheet having a hard surface or a coating surface with protrusions formed by hard beads, the prism pattern may be destroyed by a friction or an external impact. For this reason, a poor appearance or a reduction in brightness by optical loss may be caused.

Recently, a polyolefin-based light guide panel for light-weight backlight units has been increasingly used due to its easy injection molding and low specific gravity. However, the polyolefin-based light guide panel is also faced with the problems arisen in the prism-patterned light guide panel due to its low surface hardness. Korean Patent Laid-Open Publication No. 2004-0039222 discloses an acrylic light guide panel for use in a backlight unit for a plastic LCD, which is formed by mixing or a chemical reaction of a plastic rubber or a material having a high degree of flexibility with an acrylics resin. However, the acrylic light guide panel also undergoes the same problems as in the use of the prism-patterned light guide panel due to its low surface hardness.

To solve these problems, Korean Patent Laid-Open Publication No. 2003-0025192 discloses a reflection sheet including a damage preventive layer containing a polyurethane bead or a silicon rubber bead on a base sheet. However, the polyurethane bead has substantially insufficient flexibility and thus cannot sufficiently prevent damage to a light guide panel. The silicon rubber bead is flexible but unreacted monomers or oligomers diffused out from a surface of the silicon rubber bead may cause a bright unevenness.

Technical Solution

The present invention provides a reflection sheet capable of sufficiently protecting a surface of a light guide panel, simultaneously with preventing an optical degradation such as bright unevenness.

The present invention also provides a backlight unit for a liquid crystal display employing the reflection sheet and thus providing better and uniform brightness.

According to an aspect of the present invention, there is provided a reflection sheet for a backlight unit including: a base sheet; and a flexible coating layer, formed on at least a surface of the base sheet, containing at least one flexible elastomeric bead selected from the group consisting of an elastomeric acrylic bead, an elastomeric nylon bead, and a microcapsule resin bead having a core charged with an air or an organic material.

The reflection sheet may further include a metal reflection layer and a transparent resin layer that are sequentially stacked between the base sheet and the flexible coating layer.

According to another aspect of the present invention, there is provided a backlight unit for a liquid crystal display including:

a light source for emitting light beams;

a light guide panel located beside the light source for transmitting the light beams and having a side surface into which the light beams are incident from the light source, a lower surface, and an upper surface from which the light beams are exited;

an optical sheet, disposed on the upper surface of the light guide panel, uniformly diffusing the light beams exited from the light guide panel and refracting the diffused light beams in a substantially perpendicular direction to an upper surface of the optical sheet; and a reflection sheet, disposed on the lower surface of the light guide panel, reflecting the light beams from the light source toward the light guide panel, the reflection sheet including:

a base sheet; and a flexible coating layer, formed on at least a surface of the base sheet, containing at least one flexible elastomeric bead selected from the group consisting of an elastomeric acrylic bead, an elastomeric nylon bead, and a microcapsule resin bead having a core charged with an air or an organic material.

According to yet another aspect of the present invention, there is provided a liquid crystal display including the reflection sheet according to the present invention.

A reflection sheet according to the present invention includes a flexible coating layer containing a particularly selected elastomeric flexible elastomeric bead and thus having excellent resistance to impact and friction. Therefore, the reflection sheet can sufficiently protect a surface of a light guide panel without causing an optical degradation such as reduction in brightness, bright unevenness, and so forth.

Furthermore, the reflection sheet of the present invention may further include a metal reflection layer. According to this embodiment, better brightness characteristics are ensured.

Advantageous Effects

The reflection sheet according to the present invention includes a flexible coating layer, and thus, exhibits excellent resistance to friction and impact. When a metal reflection layer is further included in the reflection sheet, the reflection sheet is excellent in specular reflectivity and brightness as well as in resistance to friction and impact. Therefore, the reflection sheet of the present invention can be usefully applied to a light guide panel of a backlight unit having a weak surface hardness or requiring a surface protection due to a surface prism pattern. In detail, when the reflection sheet of the present invention is adopted to a backlight unit, damage to a light guide panel can be effectively prevented, thereby preventing reduction in brightness and bright unevenness due to damage to a light guide panel. The brightness of the backlight unit can also be enhanced.

DESCRIPTION OF DRAWINGS

A more complete appreciation of the invention, and many of the attendant advantages thereof, will be readily apparent as the same becomes better understood by reference to the following detailed description when considered in conjunction with the accompanying drawings, wherein.

BEST MODE

A reflection sheet according to the present invention will now be described more fully with reference to the accompanying drawings, in which exemplary embodiments of the invention are shown.

Figure 2:
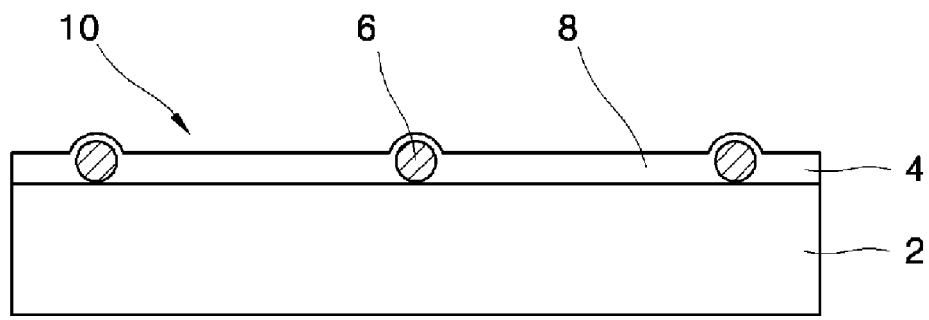
FIG. 2 is a schematic sectional view illustrating a reflection sheet according to an embodiment of the present invention.

FIG. 2 is a schematic sectional view illustrating a reflection sheet 10 for a backlight unit according to an embodiment of the present invention. Referring to FIG. 2, the reflection sheet 10 includes a base sheet 2 made of a white opaque resin; and a flexible coating layer 4, formed on the base sheet 2, containing at least one flexible elastomeric bead 6 having a rubbery elasticity selected from the group consisting of an elastomeric acrylic bead, an elastomeric nylon bead, and a microcapsule resin bead having a core charged with an air or an organic material.

When the reflection sheet 10 of this embodiment is adopted to a backlight unit, a light guide panel is contacted to only protrusions of the flexible coating layer 4 formed by the flexible elastomeric bead 6. Therefore, a surface damage to the light guide panel can be remarkably reduced. Furthermore, a frictional damage caused by winding or overlapping during storage or transport of the reflection sheet 10 can be minimized.

The base sheet 2 made of the white opaque resin imparts basic reflectivity and masking capability to the reflection sheet 10. As used herein, the 'white opaque resin' of the base sheet 2 indicates a resin having a white color by use of a white pigment or through the dispersion of microbubbles. Examples of the resin for use in the base sheet 2 include, but are not limited to, polyester resins including polyethyleneterephthalate (PET), polybutyleneterephthalate (PBT) and polyethylenenaphthalate (PNT), acrylic resins, polycarbonate resins, polystyrene, polyolefines, cellulose acetate, and polyvinylchloride. PET with good heat resistance is preferable.

The thickness of the base sheet 2 may range from 50 to 250 μm, but the present invention is not limited thereto. If the thickness of the base sheet 2 is less than 50 μm, the brightness of a backlight unit and thus a liquid crystal display using it may be decreased due to a poor reflectivity of the base sheet 2. On the other hand, if it exceeds 300 μm, curling may occur during its fabrication processes or storage. Furthermore, the thickness of a backlight unit increases, which makes it difficult to fabricate a thin liquid crystal display.

Examples of the white pigment include, but are not limited to, titanium oxide, silicon oxide, zinc oxide, lead carbonate, barium sulfate, calcium carbonate, and aluminum oxide. Titanium oxide with high masking capability is preferable.

The white pigment may have an average particle size of 0.1 to 50 µm, and more preferably 0.1 to 5 µm. If the average particle size of the white pigment is less than 0.1 µm, the reflectivity and masking capability of the reflection sheet 10 may be insufficient. On the other hand, if it exceeds 50 µm, the reflectivity and masking capability of the reflection sheet 10 may become non-uniform.

The content, average particle size, and so forth of the bubbles that can be dispersed in the base sheet 2 can be appropriately adjusted so that the reflectivity and masking capability of the reflection sheet 10 are of a similar level to those in a conventional reflection sheet.

The flexible coating layer 4 includes a binder 8 and the flexible elastomeric bead 6. The flexible elastomeric bead 6 is dispersed in the binder 8. The reflection sheet 10 has a plurality of protrusions due to the presence of the flexible elastomeric bead 6. Thus, when the reflection sheet 10 is disposed on a rear surface of a light guide panel, the rear surface of the light guide panel is not contacted to the entire front surface of the reflection sheet 10 but is contacted to only the plurality of the protrusions of the reflection sheet 10. Therefore, sticking between the reflection sheet 10 and a light guide panel and a brightness unevenness of a liquid crystal display panel are prevented. The thickness of the flexible coating layer 4 (the thickness of the binder layer 8 without the flexible elastomeric bead 6) is not particularly limited, but may range from 1 to 50 µm, preferably 1 to 20 µm.

The flexible elastomeric bead 6 is at least one flexible elastomeric bead selected from the group consisting of an elastomeric acrylic bead, an elastomeric nylon bead, and a microcapsule resin bead having a core charged with an air or an organic material. The flexible elastomeric bead 6 reduces the surface hardness of the protrusions of the flexible coating layer 4, thereby preventing a surface damage to a light guide panel. In particular, the flexible elastomeric bead 6 used herein has an elastic recovery of 30 to 90%, preferably 50 to 70%, through adjustment in degrees of crosslinking, crystallinity, and/or molecular weight. If the elastic recovery of the flexible elastomeric bead 6 is less than 30%, rubbery elasticity may not be substantially accomplished so that the surface hardness of the protrusions of the flexible coating layer 4 becomes hard, thereby may cause a surface damage to a light guide panel. On the other hand, if it exceeds 90%, it may be difficult to manufacture a microscale flexible elastomeric bead.

The elastomeric acrylic bead is a flexible elastomeric bead having a rubbery elasticity made of a homopolymer or copolymer of alkyl acrylate ester and/or alkyl methacrylate ester with (meth)acrylonitrile, (meth)acrylamide, methyl (meth)acrylate, and/or N-methylol (meth)acrylamide. The physical properties of the homopolymer or copolymer resin are significantly affected by the type of a side chain alkyl group. Generally, the homopolymer or copolymer made from an alkyl acrylate ester monomer tends to have a low glass transition temperature and imparts good elasticity and flexibility, and the homopolymer or copolymer made from an alkyl methacrylate ester monomer tends to exhibit a high glass transition temperature and hard characteristics (i.e., poor elasticity and flexibility). Thus, it is preferable that the elastomeric acrylic bead used herein is made of a homopolymer or copolymer made from an alkyl acrylate ester monomer with good elastic recovery. The alkyl group is an alkyl group of C1~C10, preferably an alkyl group of C1~C6, and more preferably an alkyl group of C1~C4.

The elastomeric nylon bead is a flexible elastomeric bead made of a nylon resin such as nylon 6, nylon 66, nylon 7, nylon 46, nylon 11, or nylon 12. The flexibility and elastic recovery of the nylon bead are mainly affected by a degree of crystallinity. Thus, the nylon bead can have the above-described degree of elastic recovery by appropriately adjusting the degree of crystallinity. Generally, nylon 11 and nylon 12 provide a higher elastic recovery than nylon 6 and nylon 66.

The microcapsule resin bead having the core charged with air or an organic material is not particularly limited provided that it has the above-described degree of elastic recovery. For example, the microcapsule resin bead may be an elastomeric hollow bead in which the core of the bead made of a homopolymer or copolymer made from of alkyl acrylate ester monomer, alkyl methacrylate ester monomer, and/or (meth) acrylonitrile monomer is charged with air or an organic material. The organic material may be a liquid or solid. In particular, an organic material having a lower hardness than the shell portion of the hollow bead is preferable due to its contribution to high elastic recovery. The organic material may be alkyl acrylate ester, alkyl methacrylate ester, a low boiling point hydrocarbon, or a polymer thereof. The alkyl group may be an alkyl group of C1~C10, preferably an alkyl group of C1~C6, and more preferably an alkyl group of C1~C4. The low boiling point hydrocarbon may be a hydrocarbon of C3~C15. Preferred are butane, pentane, hexane, heptane, octane, nonane, decane, and so forth.

The shape of the flexible elastomeric bead 6 used herein is not particularly limited provided that the flexible coating layer 4 have relatively smooth surface protrusions and thus can prevent damage to a light guide panel. For example, the flexible elastomeric bead 6 may be in a spherical, spheroid, spindle, or fibrous form. A spherical flexible elastomeric bead is particularly preferable due to its excellent damage prevention capability. The flexible elastomeric bead 6 may have a mono-dispersed or poly-dispersed particle distribution, and an average particle size of 1 to 100 µm, more preferably, 3 to 20 µm. If the average particle size of the flexible elastomeric bead 6 is less than 1 µm, the flexible elastomeric bead 6 may be completely buried in the flexible coating layer 4 due to an excessively small particle size even when it has rubbery elasticity, and thus may not appropriately functions. On the other hand, if it exceeds 100 µm, coating may be difficult, and the flexible elastomeric bead 6 may be detached from a binder resin due to weak adhesion.

The content of the flexible elastomeric bead 6 may range from 0.1 to 50 wt %, more preferably 0.5 to 30 wt %, and still more preferably 1 to 5 wt % based on the total weight of the flexible coating layer 4. If the content of the flexible elastomeric bead 6 is less than 0.1 wt %, a bead distribution per unit area may decrease, and thus a sufficient effect may not be obtained. On the other hand, if it exceeds 50 wt %, the amount of the binder 8 relative to that of flexible elastomeric bead 6 is insufficient, and thus detachment of the flexible elastomeric bead 6 may occur or adhesion of the flexible elastomeric bead 6 to the base sheet 2 may be insufficient.

The binder 8 is formed by coating a suitable resin composition and covers the flexible elastomeric bead 6 and let them adhere onto the entire front surface of the base sheet 2. The binder 8 may further include at least one selected from an inorganic filler, a curing agent, a plasticizer, a dispersant, a leveling agent, an antistatic agent, a UV absorbent, an antioxidant, a viscosity modifier, a lubricant, and a light stabilizer.

The binder 8 has a pencil hardness of 4 B~2 H, preferably 2 B~H, and more preferably HB. When the flexible elastomeric bead 6 is covered with the binder 8 having the above-described pencil hardness, an external pressure applied to a surface of the reflection sheet 10 can be absorbed by the binder 8, thereby reducing damage to a light guide panel disposed on a surface of the reflection sheet 10 in a backlight unit.

Examples of a resin used in the formation of the binder 8 include, but are not limited to, an acrylic resin, a polyester resin, a polyether polyol resin, a polyester polyol resin, a polyurethane resin, a silicon-based resin, a fluorine-based resin, a polyamideimide resin, an epoxy resin, and a UV curable resin. These resins can be used alone or in combination of two or more. The resin used in the formation of the binder 8 may be a transparent resin that does not affect the reflectivity and masking capability of the base sheet 2. A colorless transparent resin is particularly preferable.

In view of both processability and physical properties, the resin used in the formation of the binder 8 may have a number average molecular weight of 1,000 to 500,000, and more preferably 5,000 to 100,000.

The acrylic resin for use in the binder 8 may be a homopolymer of alkyl acrylate ester monomer or alkyl methacrylate ester monomer, such as polymethylacrylate, polymethylmethacrylate, polyethylacrylate, and polyethylmethacrylate, or a copolymer of those monomers with acrylonitrile, acrylamide, and/or N-methylolacrylamide.

When a polyol resin is used as a resin for the binder 8, a polyisocyanate compound can be contained as a curing agent in a resin composition. In this case, a cured product is a polyurethane resin. The use of the polyisocyanate compound increases the curing speed of a resin composition. Thus, even when a cationic antistatic agent for increasing the dispersion stability of an inorganic filler is contained in a resin composition, reduction in the curing speed by the cationic antistatic agent can be sufficiently compensated, thereby further increasing productivity.

The polyisocyanate compound may be a toluene diisocyanate derivative, a xylene diisocyanate derivative or an aliphatic diisocyanate derivative. A xylene diisocyanate derivative alone or a mixture of the xylene diisocyanate derivative with an aliphatic diisocyanate derivative is particularly preferable. The xylene diisocyanate derivative is an aromatic diisocyanate derivative providing a higher reaction speed of a resin composition and experiencing a yellowing and a degradation by heat or UV light at a relatively low level. Thus, a decrease in the transmittance of the reflection sheet 10 over a long period of time can be reduced. Meanwhile, the aliphatic diisocyanate derivative exhibits a lower capability in enhancing reaction speed but a remarkably low level of yellowing, degradation, and so forth due to exposure to heat and/or UV rays, and so forth, than the aromatic diisocyanate derivative. Thus, the combination of the aliphatic diisocyanate derivative with the xylene diisocyanate derivative can achieve balance of an increase in reaction speed and a decrease of yellowing, degradation, and so forth.

The aliphatic diisocyanate derivative may be an isophorone diisocyanate derivative or a hexamethylene diisocyanate derivative. The isophorone diisocyanate derivative and the hexamethylene diisocyanate derivative are capable of providing a relatively high curing speed and increasing productivity and heat resistance.

The polyisocyanate compound may be used in an amount of 2 to 20 wt %, preferably 5 to 15 wt %, based on the weight of a resin in a resin composition for forming the binder 8. When the polyisocyanate compound is used within the above content range, an enhancement in curing speed of a resin composition can be efficiently accomplished.

As described above, the resin composition for forming the binder 8 may further include an inorganic filler. The inorganic filler dispersed in the binder 8 can increase the heat resistance of the flexible coating layer 4, and thus the heat resistance of the reflection sheet 10. Accordingly, when the reflection sheet 10 is adopted to a backlight unit, deformation of the reflection sheet 10 due to exposure to the heat emitted from a light source or moisture in air can be remarkably reduced.

The inorganic filler may be, in particular, an inorganic oxide filler, but the present invention is not limited thereto. The inorganic oxide may be various oxygen-containing metal compounds forming a three-dimensional network through a bonding of a metal element mainly with an oxygen atom. The metal element constituting the inorganic oxide may be an element selected from Group II-VI of the periodic table, and more preferably, an element selected from Group III~V of the periodic table. An element selected from Si, Al, Ti and Zr is particularly preferable. Colloidal silica is the most preferable as the inorganic filler. The shape of the inorganic filler is not particularly limited and may be in any form, e.g., in a spherical, needle, plate, scale, or irregular form.

The inorganic filler may have an average particle size of 0.1~10 μm, more preferably 0.1~5 μm. If the average particle size of the inorganic filler is less than 0.1 μm, agglomeration is likely to occur due to a high surface energy of the inorganic filler. On the other hand, if it exceeds 10 μm, a white cloudy flexible coating layer 4 may be formed, which may adversely affect the reflectivity and masking capability of the reflection sheet 10.

The inorganic filler may be used in an amount of 1 to 500 wt %, more preferably, 1 to 200 wt %, and most preferably 1 to 50 wt %, based on the weight of the resin in the resin composition for forming the binder 8. If the amount of the inorganic filler is less than 1 wt %, the heat resistance of the reflection sheet 10 may not be sufficiently obtained. On the other hand, if it exceeds 500 wt %, formulation of components constituting the resin composition becomes difficult and the damage preventive property of the flexible coating layer 4 may be lowered. Meanwhile, the inorganic filler may be an inorganic filler in which an organic polymer is fixed to a surface thereof or is contained in the inorganic filler particles.

The resin composition for forming the binder 8 may include an antistatic agent. Examples of the antistatic agent include, but are not limited to, an anionic antistatic agent such as an alkyl sulfate salt compound and an alkyl phosphate salt compound; a cationic antistatic agent such as a quaternary ammonium salt compound, an imidazoline compound, and a betaine derivative; a nonionic antistatic agent such as polyethyleneglycols, polyoxyethylene sorbitan monostearate ester, and ethanolamides; and a polymer antistatic agent such as polyacrylic acid. Among them, preferred is a cationic antistatic agent having a relatively high antistatic effect and causing no adverse effect on dispersion stability of the inorganic filler particles. Among the cationic antistatic agent, a quaternary ammonium salt compound and a betaine derivative capable of further increasing the antistatic property of the hydrophobic binder 8 are particularly preferable.

The antistatic agent may be used in an amount of 0.1 to 10 wt %, preferably 0.5 to 5 wt % based on the weight of the resin in the resin composition for forming the binder 8. If the content of the antistatic agent is less than 0.1 wt %, an antistatic effect may be insufficient. On the other hand, if it exceeds 10 wt %, the strength of the flexible coating layer 4 may be lowered.

A method of manufacturing the reflection sheet 10 of this embodiment will now be described. First, a resin constituting the binder 8 and the flexible elastomeric beads 6 are added to a solvent and shaken vigorously to the extent that the elastomeric beads 6 are finely dispersed to a primary particle size. Then, when needed, the above-described optional additives are further added to thereby obtain a resin composition for forming the flexible coating layer 4. Then, the resin composition is coated on a surface of the white opaque base sheet 2 by any one of known coating methods and dried to form the flexible coating layer 4. This completes the fabrication of the reflection sheet 10 of this embodiment.

Figure 3:
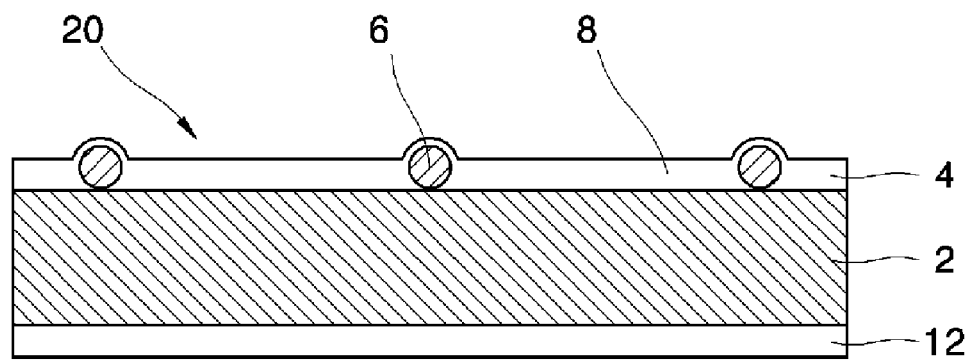
FIG. 3 is a schematic sectional view illustrating a reflection sheet according to another embodiment of the present invention.

FIG. 3 is a schematic sectional view illustrating a reflection sheet 20 according to another embodiment of the present invention. Referring to FIG. 3, the reflection sheet 20 further includes a masking coating layer 12 disposed on a rear surface of the base sheet 2, in addition to the component layers constituting the reflection sheet 10 according to the embodiment shown in FIG. 2. The base sheet 2 and the flexible coating layer 4 in the reflection sheet 20 according to the embodiment shown in FIG. 3 are the same as those shown in FIG. 2, and thus, are represented by the same reference numerals as those shown in FIG. 2 and a detailed description thereof will be omitted.

The masking coating layer 12 disposed on the rear surface of the base sheet 2 contains a white pigment and serves to further enhance the reflectivity and masking capability of the reflection sheet 20. The white pigment may have an average particle size of 0.1 to 50 μm, and the content of the white pigment may range from 10 to 90 wt % based on the total weight of the masking coating layer 12. If the content of the white pigment is less than 10 wt %, an enhancement effect in reflectivity and masking capability may be insignificant. On the other hand, if it exceeds 90 wt %, formulation and coating of a resin composition for forming the masking coating layer 12 may be difficult.

A method of manufacturing the reflection sheet 20 according to the embodiment shown in FIG. 3 will now be described.

First, a resin constituting the binder 8 and the flexible elastomeric beads 6 are added to a solvent and shaken vigorously to the extent that the elastomeric beads 6 are finely dispersed to a primary particle size. Then, when needed, the above-described optional additives are further added to thereby obtain a resin composition for forming the flexible coating layer 4. Then, the resin composition is coated on a surface of the white opaque base sheet 2 by any one of known coating methods and dried to form the flexible coating layer 4. And then, a resin composition for forming the masking coating layer 12 is coated on an opposite surface of the base sheet 2 to the flexible coating layer 4 by any one of known coating methods and dried to form the masking coating layer 12. This completes the fabrication of the reflection sheet 20 according to the embodiment shown in FIG. 3. Meanwhile, in fabrication of the reflection sheet 20 according to the embodiment shown in FIG. 3, the masking coating layer 12 may also be formed prior to forming the flexible coating layer 4.

A resin, a white pigment, and other optional additives for use in the resin composition for forming the masking coating layer 12 are not particularly limited. The white pigment may be the same as the white pigment contained in the base sheet 2.

The coating amount (when dried) of the resin composition for forming the masking coating layer 12 may range from 1 to 50 g/□, preferably from 5 to 45 g/□, and more preferably from 10 to 40 g/□. If the coating amount of the resin composition is less than 1 g/□, an enhancement effect in reflectivity and masking capability may be insignificant. On the other hand, if it exceeds 50 g/□, the thickness of the masking coating layer 22 may be excessively increased, resulting in thick backlight unit, and the strength of the masking coating layer 12 may be lowered.

Like the reflection sheet 10 according to the embodiment shown in FIG. 2, the reflection sheet 20 according to the embodiment shown in FIG. 3 exhibits reflectivity and masking capability by the base sheet 2 and more efficiently prevents damage and sticking to a light guide panel by the flexible coating layer 4. The masking coating layer 12 disposed on the rear surface of the base sheet 2 can further enhance reflectivity and masking capability.

Figure 4:
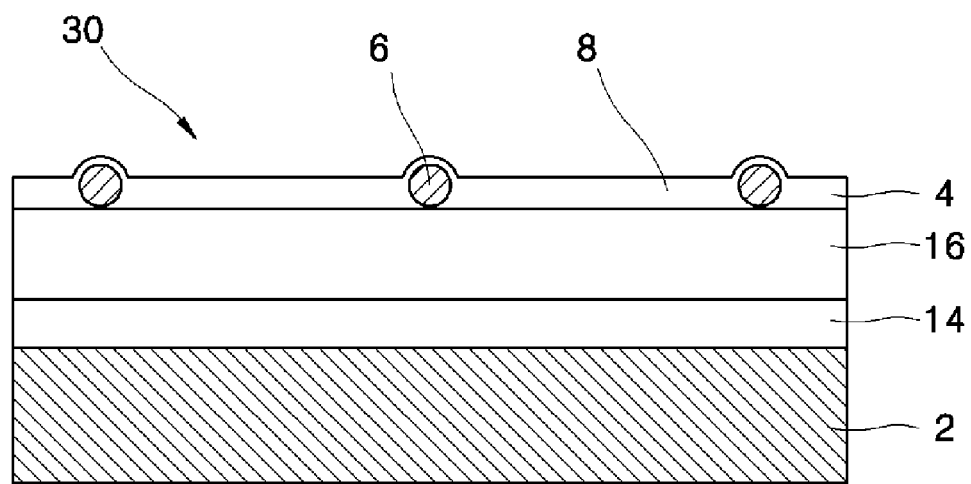
FIG. 4 is a schematic sectional view illustrating a reflection sheet according to still another embodiment of the present invention.

FIG. 4 is a schematic sectional view illustrating a reflection sheet 30 according to still another embodiment of the present invention. Referring to FIG. 4, the reflection sheet 30 further includes a metal reflection layer 14 and a transparent resin layer 16 which are sequentially stacked between the base sheet 2 and the flexible coating layer 4, in addition to the component layers constituting the reflection sheet 10 according to the embodiment shown in FIG. 2. The base sheet 2 and the flexible coating layer 4 in the reflection sheet 30 according to the embodiment shown in FIG. 4 are the same as those shown in FIG. 2, and thus, are represented by the same reference numerals as those shown in FIG. 2 and a detailed description thereof will be omitted. In the reflection sheet 30 according to this embodiment of the present invention, as reflection of light beams is achieved by metal reflection layer 14, the base sheet 2 is not always formed by an opaque sheet materials but may be formed by a transparent sheet.

The metal reflection layer 14 has a high reflectivity of light beams, and thus the reflection sheet 30 including the metal reflection layer 14 can exhibit much better reflectivity compared to one having no the metal reflection layer 14. Thus, when the reflection sheet 30 according to this embodiment is adopted to a backlight unit, the brightness of light exited from a light guide panel can be further enhanced. The metal reflection layer 14 may be made of any metal having light reflectivity. Examples of the metal include, but are not limited to, copper, silver, aluminum, tin, gold, brass, bronze, and stainless steel. Among them, silver (Ag) is preferable because it does not absorb light and has a high specular reflectivity. The metal reflection layer 14 may be formed by any one of known metal layer forming methods such as vacuum deposition, sputtering, and so on.

The thickness of the metal reflection layer 14 is not limited but may range from 50 to 2000 Å, preferably from 100 to 1500 Å, and more preferably from 500 to 1000 Å. If the thickness of the metal reflection layer 14 is less than 50 Å, a reflectivity enhancement effect may be insignificant, and furthermore, it is difficult to form such a thin film because too much voids are generated. On the other hand, if it exceeds 2000 Å, the cost of manufacturing increases because of slow rate of vacuum deposition or sputtering processes and no further increase in reflectivity can be expected.

A material for transparent resin layer 16 is not particularly limited provided that the transparent resin layer 16 can be formed as a transparent film. For example, the transparent resin layer 16 may be made of polyester, polycarbonate, polyolefin, and so forth. The thickness of the transparent resin layer 16 is not particularly limited but may range from 0.1 to 100 μm. If the thickness of the transparent resin layer 16 is less than 0.1 μm, its function of protecting the metal reflection layer 14 may not be insufficient. On the other hand, if it exceeds 100 μm, the specular reflectivity of the metal reflection layer 14 deteriorate.

In the mean time, an anti-oxidation layer (not shown) for protecting the metal reflection layer 14 may be formed between the base sheet 2 and the metal reflection layer 14. The anti-oxidation layer protects the metal reflection layer 14 from oxidation, moisture in air, contamination due to a contact with impurities, and so forth and is made of an inorganic material such as Si, Ti, or oxides thereof or of an organic polymer resin that may contain additives such as an antioxidant, a UV absorbent, and so forth.

A method of manufacturing the reflection sheet 30 according to the embodiment shown in FIG. 4 will now be described.

First, a composite film having the metal reflection layer 14 deposited on a surface of the transparent resin layer 16 is prepared. For this, for example using a conventional vacuum deposition technique or a sputtering technique, high energy in the form of a high energy radiation and/or heat is applied to a metal target in a high vacuum chamber of about $10^{-5}$ torr or less, and the metal is evaporated to produce metal vapors. The metal vapors are made to be deposited on a surface of the transparent resin layer 16 made of polyester, polycarbonate, polyolefin, and so forth to thereby form the composite film having the metal reflection layer 14 deposited on a surface of the transparent resin layer 16. When desired, the anti-oxidation layer for protecting the metal reflection layer 14 may be formed by deposting an inorganic material or by coating an organic polymer resin onto the metal reflection layer 14. On a surface of the opaque or transparent base sheet 2 is laminated the composite film in such a manner that the metal reflection layer 14 of the composite film abuts against the base sheet 2. When laminating the composite film, it is preferable to use an appropriate adhesive for increasing an adhesion between the metal reflection layer 14 of the composite film and the base sheet 2. It is preferable to use an adhesive having resistance to a yellowing that may be caused by light or heat. For example, the adhesive may be an acrylic adhesive, an acrylic modified urethane-based adhesive, and so forth. Finally, the formation of the flexible coating layer 4 according to the above-described method completes the fabrication of the reflection sheet 30 according to the embodiment shown in FIG. 4.

Figure 5:
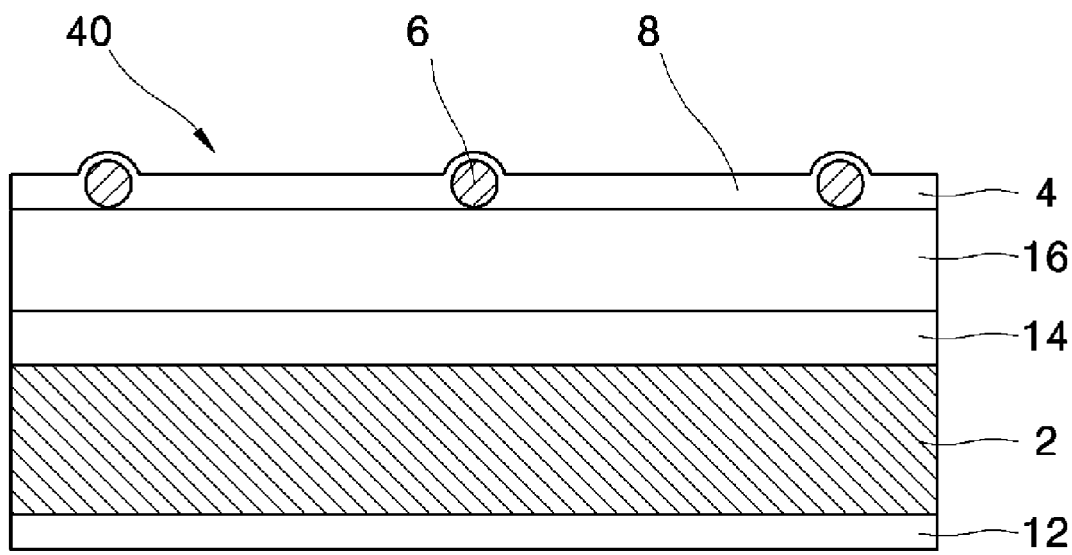
FIG. 5 is a schematic sectional view illustrating a reflection sheet according to yet another embodiment of the present invention.

FIG. 5 is a schematic sectional view illustrating a reflection sheet 40 according to yet another embodiment of the present invention. Referring to FIG. 5, the reflection sheet 40 further includes the masking coating layer 12 disposed on the rear surface of the base sheet 2, in addition to the component layers constituting the reflection sheet 30 shown in FIG. 4. The base sheet 2 and the flexible coating layer 4 in the reflection sheet 40 according to the embodiment shown in FIG. 5 are the same as those shown in FIG. 2, and thus, are represented by the same reference numerals as those shown in FIG. 2 and a detailed description thereof will be omitted. In the reflection sheet 40 according to this embodiment of the present invention, as reflection of light beams is achieved by metal reflection layer 14, the base sheet 2 is not always formed by an opaque sheet materials but may be formed by a transparent sheet.

The reflection sheet 40 according to this embodiment can be manufactured by forming the reflection sheet 30 shown in FIG. 4 according to the method of manufacturing the reflection sheet 30 and forming the masking coating layer 12 on the rear surface of the base sheet 2 according to the above-described method. Of course, the masking coating layer 12 can be formed prior to forming the flexible coating layer 4.

The reflection sheets 10 and 20 according to the present invention exhibit reflectivity and masking capability by the base sheet 2. Also, the reflection sheets 10 and 20 include the flexible coating layer 4 with excellent resistance to impact and friction using a particularly selected flexible elastomeric bead having rubbery elasticity, and thus can efficiently prevent damage such as scratch and sticking to a light guide panel. The reflection sheets 30 and 40 further including the metal reflection layer 14 exhibit much better light reflectivity than the reflection sheets 10 and 20 not having the metal reflection layer 14. The reflection sheet 20 and 40 further including the masking coating layer 12 disposed on the rear surface of the base sheet 2 have better reflectivity and masking capability than the reflection sheets 10 and 30 not having the masking coating layer 12.

Figure 1:
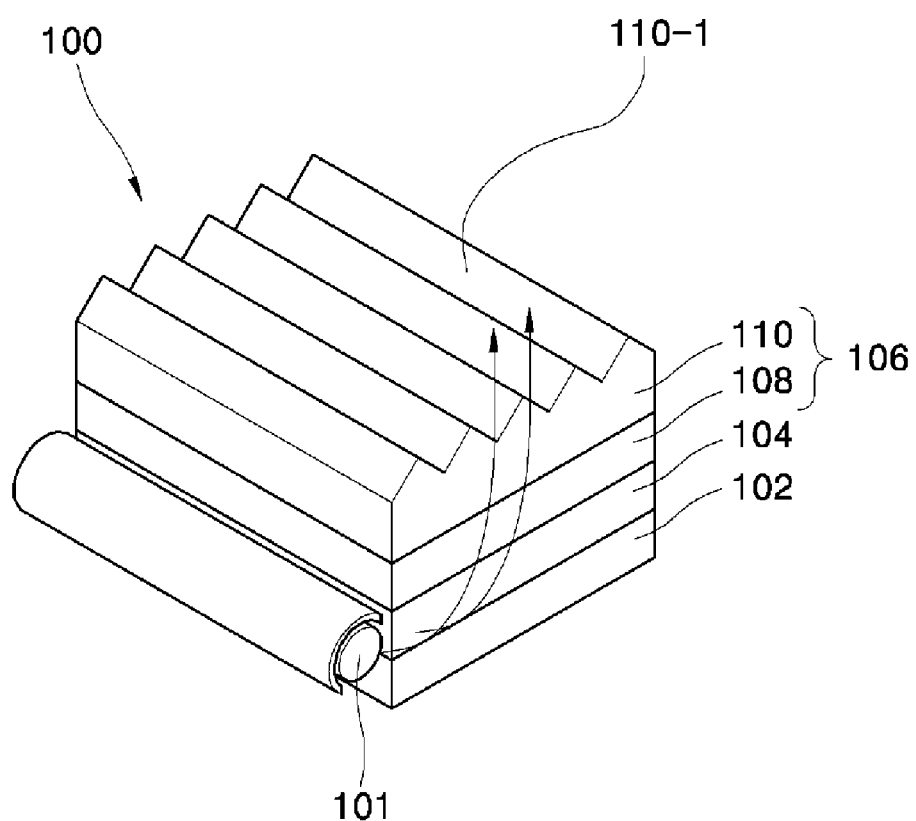
FIG. 1 is a schematic perspective view illustrating a conventional edgelight-type backlight unit.

Therefore, when any one of the reflection sheets 10, 20, 30, and 40 according to the present invention is disposed on a rear surface of a light guide panel (see 104 of FIG. 1) in a backlight unit, as described above, damage to the light guide panel can be prevented. Therefore, bright unevenness of a LCD panel by damage of the rear surface of the light guide panel can be prevented and it is easy to assemble a backlight unit. In particular, the use of the reflection sheet 30 or 40 further including the metal reflection layer 14 with high reflectivity can further enhance the brightness of a backlight unit. In the case of using the reflection sheet 20 or 40 including the masking coating layer 12 disposed on the rear surface of the base sheet 2, the masking coating layer 12 can prevent a structure such as a frame disposed on a rear surface of the reflection sheet 20 or 40 from appearing on a screen, thereby preventing bright unevenness.

Hereinafter, a reflection sheet according to the present invention will be described more specifically with reference to the following examples. The following examples are for illustrative purposes and are not intended to limit the scope of the invention.

Physical properties listed in Table 1 below were tested as follows.

Elastic Recovery of Flexible Elastomeric Bead

The elastic recovery (%) of a flexible elastomeric bead was measured using a compression test machine (Model: PCT-200, Shimadzu, Japan) as follows under the test conditions of compression load: 1 gf/mm$^2$, compression displacement limit: particle diameter×10%, and temperature: 20±1° C.

A load was applied to a bead until the volume of the bead was reduced by 10%, and then removed. Elastic recovery of the bead was calculated according to the following equation after measuring the diameter of the bead before and after the loading.

Elastic recovery (%)=[(bead diameter after loading)/(bead diameter before loading)]×100.

Resistance to Friction

Each reflection sheet sample manufactured in the following Examples and Comparative Examples was cut to A4 paper size, and the resistance to friction of a flexible coating layer of each reflection sheet sample was evaluated as follows. That is, a reflection sheet sample was disposed on a polyolefin-based light guide panel so that a flexible coating layer of the reflection sheet sample was contacted to the light guide panel. Then, the reflection sheet sample was pulled using a self-made antifriction test machine at a linear velocity of 3 m/min under a load of 20 gf/cm$^2$. The degree of scratching caused on a prism-patterned surface of the light guide panel was observed with the naked eye and evaluated as follows.

O: Absence of scratches on the prism-patterned surface of the light guide panel

X: Presence of scratches on the prism-patterned surface of the light guide panel Impact Resistance Like in the antifriction test, a reflection sheet was disposed on a prism-patterned light guide panel so that a flexible coating layer of the reflection sheet was contacted to a triangular prism-patterned surface of the light guide panel. Then, hitting was performed 10,000 times on an upper surface of the reflection sheet using a self-made push tester equipped with a circular lip with a diameter of 2 mm under with a load of 10 $gf/cm^2$, and occurrence of white spots on the light guide panel was observed by an optical microscope. Impact resistance was evaluated as follows based on the white spots caused by pattern destruction.

O: Absence of white spots under 100× optical microscopic observation

X: Presence of white spots under 100× optical microscopic observation.

Adhesion to Polyester Film

A surface of a flexible coating layer of a reflection sheet sample was cross-hatched with a razor to form 100 square cells (0.2 cm (width)×0.2 cm (length)). A polyester adhesive tape NO31B-35 (NITTO DENKO Corp., Japan) was attached to the surface of the flexible coating layer with the square cells and then quickly detached by hand. At this time, adhesion was evaluated as follows.

O: No delamination of the square cells

X: Delamination of at least one of the square cells.

Specular Reflectivity (550 nm)

The specular reflectivity of a reflection sheet sample relative to the standard white sheet at a wavelength of 550 nm was measured using a reflectivity measurement spectrophotometer (Model: ColorQuest XE, HunterLab).

Opacity

Opacity is an index of masking capability of a reflection sheet sample. The opacity of a reflection sheet sample was evaluated in transmission mode using an optical densitometer (Model: TR1224, Macbeth).

Rate of Change in Brightness

A reflection sheet, a light guide panel, an optical diffusion sheet, and two prism sheets were sequentially stacked to form a backlight unit for 14-inch LCD. Then, the reflection sheet of the backlight unit was replaced with each reflection sheet sample manufactured in the following Examples and Comparative Examples. Brightness of a center portion of the backlight unit was measured using a luminance colorimeter (BM7, Topcon). The rate of brightness variation of each backlight unit was measured and expressed with the brightness measured with a white opaque polyester film (E60L, Toray) as a reflection surface defined as '1'. For example, if the value of the rate of brightness variation is 1.05, it denotes that the brightness is increased by 5% relative to that of the reference value of '1'.

EXAMPLE 1

100 parts by weight of an alkyl acrylate ester resin (manufactured by Aekyung Chemical Co., Ltd., Acrydic AA-960-50), 100 parts by weight of a mixed solvent of toluene and methyl ethyl ketone (50:50), 2 parts by weight of an elastomeric acrylic bead (crosslinked polymethylacrylate, manufactured by SEKISUI Chemical Co., Ltd., ACX-806) having an average particle size of about 8 μm and an elastic recovery of about 64%, 20 parts by weight of an polyisocyanate curing agent (manufactured by Aekyung Chemical Co., Ltd., DN-980S), and 0.3 parts by weight of a UV absorbent (Irganox 1010) were uniformly mixed and stirred to obtain a resin composition for forming a flexible coating layer.

The resin composition was coated on a white opaque PET base sheet (E60L, Toray) with a thickness of about 188 μm using a table coater and dried to thereby complete a reflection sheet including a flexible coating layer with a dry thickness of about 8 μm. The reflection sheet was cut to A4 paper size to be used as a reflection sheet sample.

EXAMPLE 2

An A4-sized reflection sheet sample including a flexible coating layer with a dry thickness of about 7 μm was manufactured in the same manner as in Example 1 except that 2 parts by weight of an elastomeric nylon bead made of nylon 12 (manufactured by Ganz Chemical Co., Ltd. GPA-700) having an average particle size of about 7 μm and an elastic recovery of about 66% was used instead of the elastomeric acrylic bead.

EXAMPLE 3

An A4-sized reflection sheet sample including a flexible coating layer with a dry thickness of about 6☐ was manufactured in the same manner as in Example 1 except that 2 parts by weight of a hollow flexible microcapsule resin bead (made of a composition comprised of 96 wt % of crosslinked polymethyl acrylate and 4 wt % of silicon dioxide, manufactured by Matsumoto Yuji Co., Ltd., S100) having an average particle size of about 5μm and an elastic recovery of about 59% was used instead of the rubbery acrylic bead.

EXAMPLE 4

100 parts by weight of an acrylic resin (Acrydic AA-960-50) as a binder resin, 100 parts by weight of a mixed solvent of toluene and methyl ethyl ketone (50:50), 30 parts by weight of titanium dioxide particles having an average particle size of about 0.4 μm, 10 parts by weight of silica particles having an average particle size of about 2 μm, and 20 parts by weight of an polyisocyanate curing agent (DN-980S) were uniformly mixed and stirred to obtain a resin composition for forming a masking coating layer. The resin composition was coated on a rear surface of a white opaque PET base sheet (E60L, Toray) with a thickness of about 188 μm using a table coater and dried to thereby form a masking coating layer with a dry thickness of about 25 μm.

Then, a flexible coating layer with a dry thickness of about 8 μm was formed on an opposite surface of the PET base sheet to the masking coating layer according to the method described in Example 1. The resultant structure was cut to A4 paper size to be used as a reflection sheet sample.

EXAMPLE 5

A composite film (Kyoto Nakai Shoji Co., Ltd., Kirara Flex #25) composed of a silver (Ag) reflection layer with a thickness of about 35 Å and a transparent PET film with a thickness of about 25 μm was laminated on a white opaque PET base sheet (E60L, Toray) with a thickness of about 188 μm so that the silver (Ag) reflection layer was contacted to the PET base sheet. At this time, an acrylic resin adhesive (manufactured by Aekyung Chemical Co., Ltd., AUP 310) was coated on the PET base sheet prior to the lamination.

Next, 100 parts by weight of an alkyl acrylate ester resin (Acrydic AA-960-50), 100 parts by weight of a mixed solvent of toluene and methyl ethyl ketone (50:50), 2 parts by weight of an elastomeric acrylic bead having an average particle size of about 8 μm and an elastic recovery of about 64%, 20 parts by weight of an polyisocyanate curing agent (DN-980S), and 0.3 parts by weight of a UV absorbent (Irganox 1010) were uniformly mixed and stirred to prepare a resin composition for forming a flexible coating layer. The resin composition was coated on the transparent PET film using a table coater and dried. As a result, a reflection sheet including a flexible coating layer with a dry thickness of about 8□ was obtained. The reflection sheet was cut to A4 paper size to be used as a reflection sheet sample.

EXAMPLE 6

An A4-sized reflection sheet sample including a flexible coating layer with a dry thickness of about 7 μm was manufactured in the same manner as in Example 5 except that 2 parts by weight of an elastomeric nylon 12 bead (manufactured by Ganz Chemical Co., Ltd., GPA-700) having an average particle size of about 7 μm and an elastic recovery of about 66% was used instead of the elastomeric acrylic bead.

EXAMPLE 7

An A4-sized reflection sheet sample including a flexible coating layer with a dry thickness of about 6 μm was manufactured in the same manner as in Example 5 except that 2 parts by weight of a hollow flexible microcapsule resin bead (made of a composition comprised of 96 wt % of crosslinked polymethyl acrylate and 4 wt % of silicon dioxide, manufactured by Matsumoto Yuji Co., Ltd., S100) having an average particle size of about 5 μm and an elastic recovery of about 59% was used instead of the elastomeric acrylic bead.

COMPARATIVE EXAMPLE 1

Using the uncoated white opaque PET base sheet (E60L, Toray) of Example 1 as a reflection sheet, the resistance to friction, impact resistance and so forth were evaluated.

COMPARATIVE EXAMPLE 2

An A4-sized reflection sheet sample including a flexible coating layer with a dry thickness of about 8 μm was manufactured in the same manner as in Example 1 except that 2 parts by weight of a hard acrylic bead (manufactured by SEKISUI Chemical Co., Ltd., MS10X-8D) having an average particle size of about 8 μm and an elastic recovery of about 9% was used instead of the elastomeric acrylic bead (ACX-806).

COMPARATIVE EXAMPLE 3

An A4-sized reflection sheet sample including a flexible coating layer with a dry thickness of about 8 μm was manufactured in the same manner as in Example 1 except that 0.05 parts by weight of the elastomeric acrylic bead (ACX-806) was used.

COMPARATIVE EXAMPLE 4

An A4-sized reflection sheet sample including a flexible coating layer with a dry thickness of about 8 μm was manufactured in the same manner as in Example 1 except that 55 parts by weight of the elastomeric acrylic bead (ACX-806) was used.

COMPARATIVE EXAMPLE 5

An A4-sized reflection sheet sample was manufactured in the same manner as in Example 5 except that no flexible coating layer was used.

That is, a composite film (Kyoto Nakai Shoji Co., Ltd., Kirara Flex #25) composed of a silver (Ag) reflection layer with a thickness of about 35 Å and a transparent PET film with a thickness of about 25 μm was laminated on a white opaque PET base sheet (E60L, Toray) with a thickness of about 188 μm so that the silver (Ag) reflection layer was contacted to the PET base sheet. At this time, an acrylic resin adhesive (manufactured by Aekyung Chemical Co., Ltd., AUP 310) was coated on the PET base sheet prior to the lamination. The thus-formed reflection sheet was cut to A4 size to be used as a reflection sheet sample.

Physical properties for each reflection sheet sample manufactured in Example 1-7 and Comparative Examples 1-5 were evaluated and the results are presented in Table 1 below.

TABLE 1

| Sample | Presence of flexible coating layer | Presence of Ag reflection layer | Presence of masking coating layer | Resistance to friction | Impact resistance | Adhesion to polyester film | Specular reflectivity (550 nm) (%) | Opacity | Rate of brightness variation |
|---|---|---|---|---|---|---|---|---|---|
| Exam. 1 | Yes | No | No | ○ | ○ | ○ | 0.7 | 1.32 | 1.02 |
| Exam. 2 | Yes | No | No | ○ | ○ | ○ | 0.9 | 1.33 | 1.02 |
| Exam. 3 | Yes | No | No | ○ | ○ | ○ | 0.8 | 1.32 | 1.02 |
| Exam. 4 | Yes | No | Yes | ○ | ○ | ○ | 1.0 | 1.60 | 1.03 |
| Exam. 5 | Yes | Yes | No | ○ | ○ | ○ | 87.0 | 1.32 | 1.18 |
| Exam. 6 | Yes | Yes | No | ○ | ○ | ○ | 86.8 | 1.33 | 1.20 |
| Exam. 7 | Yes | Yes | No | ○ | ○ | ○ | 87.3 | 1.32 | 1.21 |
| Comp. 1 | No | No | No | X | X | ○ | 0.7 | 1.25 | 1 |
| Comp. 2 | No | No | No | X | X | ○ | 0.6 | 1.33 | 1.01 |
| Comp. 3 | Yes | No | No | X | X | ○ | 0.9 | 1.26 | 1 |
| Comp. 4 | Yes | No | No | ○ | ○ | X | 0.6 | 1.35 | 1.02 |
| Comp. 5 | No | Yes | No | X | X | X | 97.0 | 1.35 | 1.30 |

Exam.: Example,

Comp.: Comparative Example

As shown in Table 1, the reflection sheet samples of Examples 1-7 according to the present invention exhibited better resistance to friction and impact than those of Comparative Examples 1-3 and 5 wherein no flexible coating layer was used. The reflection sheet samples of Examples 5-7, in which the silver reflection layer was used, were excellent in specular reflectivity and brightness as well as in resistance to friction and impact. The reflection sheet sample of Example 4, in which the masking coating layer was used, exhibited significantly enhanced masking capability due to good opacity.

In connection with the reflection sheet samples of Comparative Examples 1 and 2, in which neither flexible coating layer nor silver reflection layer were used, resistance to friction and impact, specular reflectivity, and brightness were all poor. The reflection sheet sample of Comparative Example 3 exhibited an insufficient enhancement effect in resistance to friction and impact due to a very small quantity of a flexible elastomeric bead in spite of including a flexible coating layer. The reflection sheet sample containing a relatively large amount of a flexible elastomeric bead of Comparative Example 4 was excellent in resistance to friction and impact but exhibited poor coating appearance and poor adhesion to a polyester film. The reflection sheet sample including no flexible coating layer but a silver reflection layer of Comparative Example 5 exhibited excellent specular reflectivity and brightness but poor resistance to friction and impact.

INDUSTRIAL APPLICABILITY

As described above, a reflection sheet according to the present invention includes a flexible coating layer, and thus, exhibits excellent resistance to friction and impact. When a metal reflection layer is further included in the reflection sheet, the reflection sheet is excellent in specular reflectivity and brightness as well as in resistance to friction and impact. Therefore, the reflection sheet of the present invention can be usefully applied to a light guide panel of a backlight unit having a weak surface hardness or requiring a surface protection due to a surface prism pattern. In detail, when the reflection sheet of the present invention is adopted to a backlight unit, damage to a light guide panel can be effectively prevented, thereby preventing reduction in brightness and bright unevenness due to damage to a light guide panel. The brightness of the backlight unit can also be enhanced.

The invention claimed is:

1. A reflection sheet for a backlight unit comprising:
a base sheet; and
a flexible coating layer, formed on at least a surface of the base sheet, containing at least one flexible elastomeric bead selected from the group consisting of an elastomeric acrylic bead, an elastomeric nylon bead, and a microcapsule resin bead having a core charged with an air or an organic material.

2. The reflection sheet of claim 1, further comprising a metal reflection layer and a transparent resin layer that are sequentially stacked between the base sheet and the flexible coating layer.

3. The reflection sheet of claim 1, further comprising a masking coating layer, formed on an opposite surface of the base sheet to the flexible coating layer, comprising at least one white pigment selected from the group consisting of titanium oxide, silicon oxide, zinc oxide, lead carbonate, barium sulfate, calcium carbonate, and aluminum oxide.

4. The reflection sheet of claim 1, wherein the flexible elastomeric bead has an average particle size of 1 to 100 μm.

5. The reflection sheet of claim 1, wherein the content of the flexible elastomeric bead ranges from 0.1 to 50 wt % based on the total weight of the flexible coating layer.

6. The reflection sheet of claim 1, wherein the flexible elastomeric bead of the flexible coating layer has an elastic recovery of 30 to 90%.

7. The reflection sheet of claim 2, wherein the metal reflection layer is a silver reflection layer.

8. The reflection sheet of claim 2, wherein the transparent resin layer is a transparent polyester layer.

9. The reflection sheet of claim 3, wherein the average particle size of the white pigment ranges from 0.1 to 50 μm, and the content of the white pigment ranges from 10 to 90 wt % based on the total weight of the masking coating layer.

10. The reflection sheet of claim 1, wherein the base sheet is a white opaque resin sheet.

11. A backlit unit for a liquid crystal display comprising:
a light source for emitting light beams;
a light guide panel located beside the light source for transmitting the light beams and having a side surface into which the light beams are incident from the light source, a lower surface, and an upper surface from which the light beams are exited;
an optical sheet, disposed on the upper surface of the light guide panel, uniformly diffusing the light beams exited from the light guide panel and refracting the diffused light beams in a substantially perpendicular direction to an upper surface of the optical sheet; and
a reflection sheet, disposed on the lower surface of the light guide panel, reflecting the light beams from the light source toward the light guide panel, the reflecting sheet including:
a base sheet; and
a flexible coating layer, formed on at least a surface of the base sheet, containing at least one flexible elastomeric bead selected from the group consisting of an elastomeric acrylic bead, an elastomeric nylon bead, and a microcapsule resin bead having a core charged with an air or an organic material.

12. The backlight unit of claim 11, wherein the reflection sheet further comprises a metal reflection layer and a transparent resin layer that are sequentially stacked between the base sheet and the flexible coating layer.

13. The backlight unit of claim 11, wherein the reflection sheet further comprises a masking coating layer, formed on an opposite surface of the base sheet to the flexible coating layer, comprising at least one white pigment selected from the group consisting of titanium oxide, silicon oxide, zinc oxide, lead carbonate, barium sulfate, calcium carbonate, and aluminum oxide.

14. The backlight unit of claim 11, wherein the flexible elastomeric bead has an average particle size of 1 to 100 μm.

15. The backlight unit of claim 11, wherein the content of the flexible elastomeric bead ranges from 0.1 to 50 wt % based on the total weight of the flexible coating layer.

16. The backlight unit of claim 11, wherein the flexible elastomeric bead of the flexible coating layer has an elastic recovery of 30 to 90%.

17. The backlight unit of claim 12, wherein the metal reflection layer is a silver reflection layer.

18. The backlight unit of claim 12, wherein the transparent resin layer is a transparent polyester layer.

19. The backlight unit of claim 13, wherein the average particle size of the white pigment ranges from 0.1 to 50 μm, and the content of the white pigment ranges from 10 to 90 wt % based on the total weight of the masking coating layer.

20. The backlight unit of claim 11, wherein the base sheet is a white opaque resin sheet.

21. A liquid crystal display comprising the reflection sheet of claim 1.

* * * * *